United States Patent
Stanzione (10) Patent No.: US 9,577,529 B2
(45) Date of Patent: Feb. 21, 2017

(54) ENERGY HARVESTING CIRCUIT AND METHOD

(71) Applicant: Stichting IMEC Nederland, Eindhoven (NL)

(72) Inventor: Stefano Stanzione, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 14/858,651

(22) Filed: Sep. 18, 2015

(65) Prior Publication Data

US 2016/0087532 A1 Mar. 24, 2016

(30) Foreign Application Priority Data

Sep. 18, 2014 (EP) ..................................... 14185366

(51) Int. Cl.
  *H02M 3/158* (2006.01)
  *H02M 3/156* (2006.01)
  *H02M 1/00* (2006.01)

(52) U.S. Cl.
  CPC ............. *H02M 3/158* (2013.01); *H02M 3/156* (2013.01); *H02M 2001/0032* (2013.01); *H02M 2001/0048* (2013.01)

(58) Field of Classification Search
  CPC .................................................... H02M 3/158
  See application file for complete search history.

(56) References Cited

U.S. PATENT DOCUMENTS

| | | | | |
|---|---|---|---|---|
| 6,448,745 B1 * | 9/2002 | Killat | ............... | H02M 3/157 323/212 |
| 2006/0250121 A1 * | 11/2006 | Tzeng | ............... | H02M 3/1563 323/288 |
| 2006/0261746 A1 * | 11/2006 | Huang | ............... | H02M 3/156 315/209 R |
| 2009/0039852 A1 * | 2/2009 | Fishelov | ............... | H02M 3/157 323/283 |
| 2010/0109626 A1 * | 5/2010 | Chen | ............... | H02M 1/4225 323/282 |

OTHER PUBLICATIONS

Paing, Thurein S. et al., "Resistor Emulation Approach to Low-Power Energy Harvesting", IEEE PESC, Jun. 2006, pp. 1-7.
Proynov, P.P. et al., "Resistive Matching With a Feed-Forward Controlled Non-Synchronous Boost Rectifier for Electromagnetic Energy Harvesting", IEEE APEC, Mar. 2013, pp. 3081-3086.
Mitcheson, P. D. et. al., "Energy Harvesting for Autonomous Systems", Artech House Publishers, 2010, ISBN:9781596937185, pp. 182-187.

* cited by examiner

*Primary Examiner* — Emily P Pham
(74) *Attorney, Agent, or Firm* — McDonnell Boehnen Hulbert & Berghoff LLP (57) ABSTRACT

An energy harvesting circuit is based on a switch mode inductive DC-DC converter circuit. The inductor current is sensed and a duration of an on-time is controlled in dependence on the sensed inductor current. A duration of an overall switching period of the converter circuit is controlled in dependence on an on-time set by a first timing control circuit and input and output voltages. This converter circuit enables independent control of the on-time and a full period of a converter cycle. Very rapid switching can be avoided which can give rise to very high energy consumption. The full cycle period can be set to achieve a desired constant value of an input resistance of the DC-DC converter, and thereby maximize power transfer.

15 Claims, 6 Drawing Sheets

ENERGY HARVESTING CIRCUIT AND METHOD

CROSS-REFERENCE TO RELATED APPLICATION

The present application is a non-provisional patent application claiming priority to European Patent Application No. 14185366.3 filed Sep. 18, 2014, the contents of which are hereby incorporated by reference.

TECHNICAL FIELD

This disclosure relates to energy harvesting circuits and methods.

BACKGROUND

There is increasing interest in energy harvesting circuits, such as for use in miniature wireless devices to enable them to operate autonomously for extended periods of time. The harvested energy may be used to charge a battery, although batteryless circuits can also be operated based on harvested power.

It is known that an inductive DC-DC converter architecture can form the main building block of an energy harvesting circuit.

Figure 1:
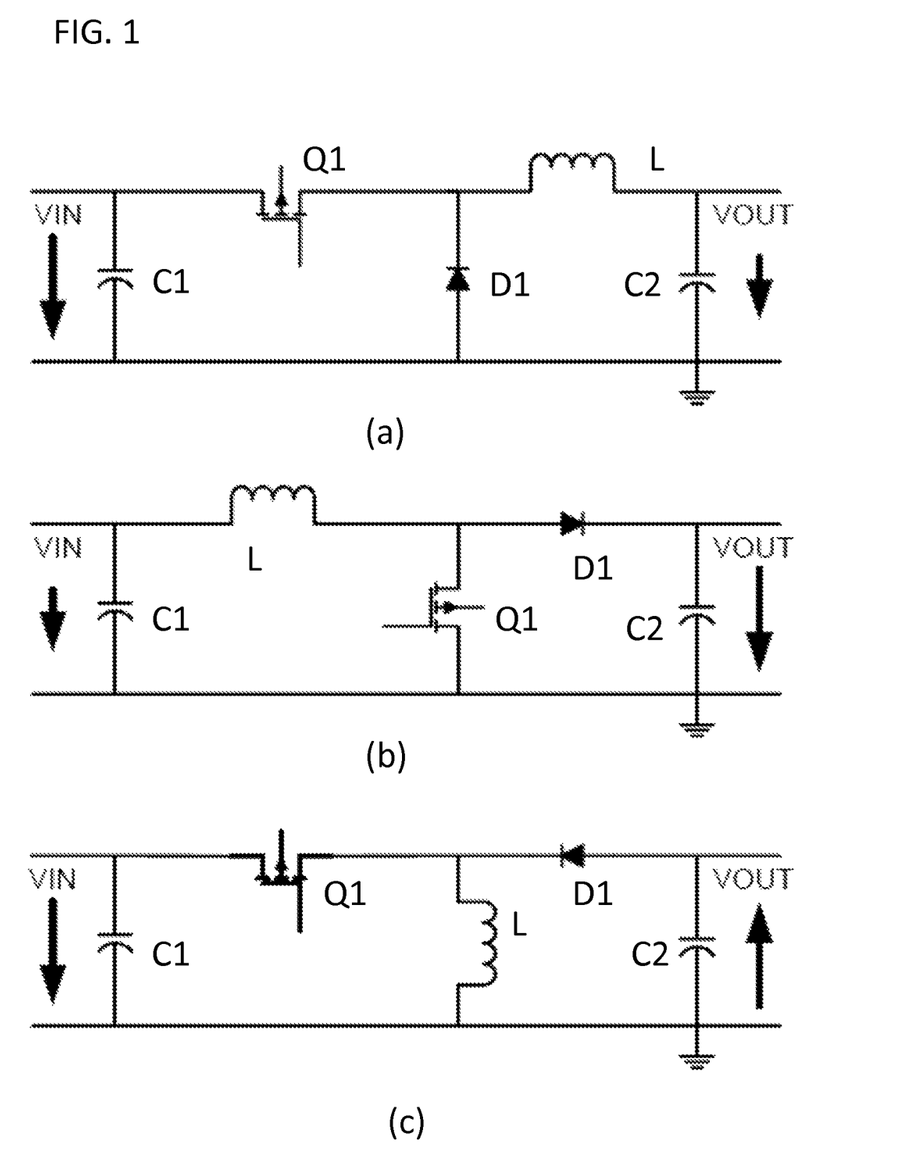
FIG. 1 shows three examples (a), (b), and (c) of inductive switch mode DC-DC converter that can be the building block of an energy harvesting circuit in accordance with examples.

FIG. 1 shows three of the most common inductor based DC-DC converter topologies as applied to energy harvesting in wireless applications. FIG. 1(a) shows a buck converter, FIG. 1(b) shows a boost converter, and FIG. 1(c) shows a polarity inverting buck-boost converter.

Each circuit is supplied by a generated voltage VIN across which an input capacitor C1 is connected. A transistor Q1 controls the completion of a first circuit in which the generated voltage is placed in series with an inductor L. The transistor Q1 is used to ramp up current in the inductor L with a slope that will be dependent on the input voltage VIN.

A diode D1 defines an output circuit with the inductor L. The diode is used to transfer the energy to the load, until the inductor current reaches a zero level.

The output VOUT is smoothed by an output capacitor C2 and may for example be stored by an energy storage element.

The switching of the transistor Q1 in each case controls the DC-DC voltage conversion operation. The operation of these circuits is well known and will not be described in further detail. Each converter topology can be run continuously at higher input power levels, or operated in a pulsed discontinuous mode at lower power levels.

Figure 2:
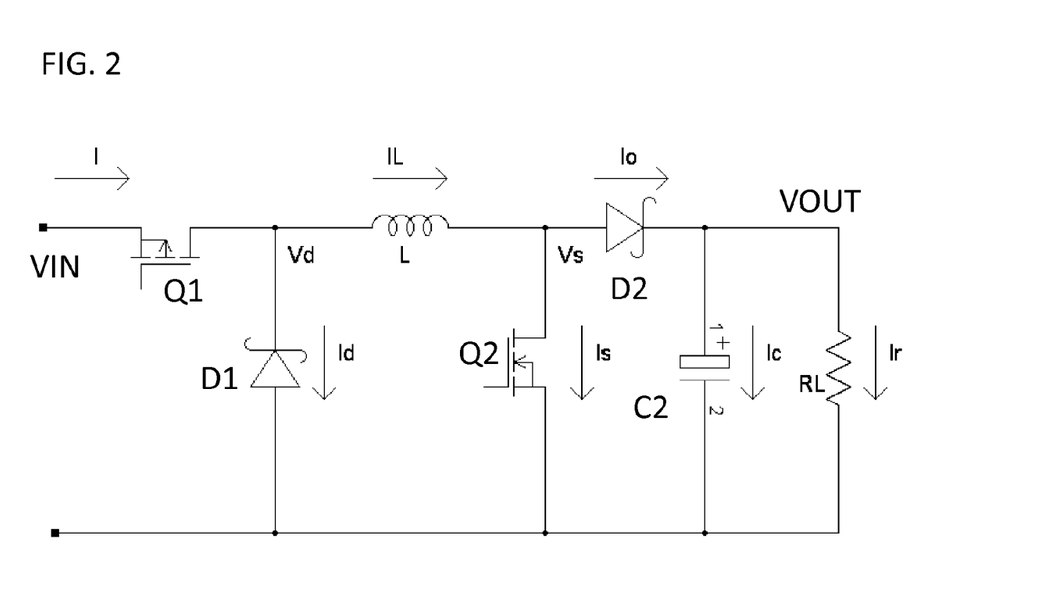
FIG. 2 shows a switch mode DC-DC buck-boost converter suitable for integrated circuit implementation.

FIG. 1 shows the most basic circuit implementations using a single switch and a single diode. In practice, the diodes can be implemented as active components using transistors and a comparator to drive the transistor at the appropriate times. Active diode implementations can be used to limit losses. Furthermore, additional circuit elements may be used, for example to make integrated circuit implementation easier. By way of example, FIG. 2 shows a buck-boost converter suitable for implementation using an integrated circuit. It can be seen that the circuit essentially combines the input switching circuit of the buck converter of FIG. 1(a) with the output switching circuit of the boost converter of FIG. 1(b). It has two switching transistors Q1, Q2 and two diodes D1, D2.

Improvements in energy harvesting technology, for example using the types of converter circuit shown in FIG. 1, have enabled a series of applications, in which the battery used to power sensors or transducers does not need to be replaced, but can be recharged using environmental energy. However, in many applications power extracted by means of energy harvesters is very small (from a fraction of a μW to a few tens of μW).

If the equivalent resistance of the harvester can be considered almost constant for the entire range of delivered powers (as in thermoelectric generators (TEGs) and sometimes in RF and vibrational harvesters), the power management interface can be designed in order to behave as a fixed resistance.

An open-loop inductive DC-DC converter can be modeled as a constant resistance under the following conditions:

Buck: $V_{IN} >> V_{OUT} => R_{IN} = 2TL/T_{ON}^2$

Boost: $V_{IN} << V_{OUT} => R_{IN} = 2TL/T_{ON}^2$

Buck-Boost: $R_{IN} = 2TL/T_{ON}^2$ where $V_{IN}$ is the input voltage, $V_{OUT}$ is the output voltage, $R_{IN}$ is the input resistance, T the conversion period, L the inductance, and $T_{ON}$ the interval of time in which the inductor is magnetized. So, if the assumptions indicated above are fulfilled, the converter input resistance is independent of input and output voltage.

This approach can be used to avoid the implementation of a Maximum Power Point Tracking (MPPT) algorithm for maximizing the output power, because, after an initial calibration, the power management unit behavior would not need to be changed anymore. This is for example explained in the article "Resistor Emulation Approach to Low-Power Energy Harvesting", IEEE PESC pp. 1-7, June 2006, of Paing T. S., et. al. This approach can however also be used together with an MPPT algorithm, allowing to dramatically lower the required tracking speed of the MPPT, because fast input and output voltage changes would not affect the impedance matching with the source.

The article "Resistive matching with feed-forward controlled non-synchronous boost rectifier for electromagnetic energy harvesting", IEEE APEC, pp. 3081-3086, March 2013 by P. P. Proynov et. al. discloses a boost converter control loop for automatically adjusting the conversion frequency in a Pulse-Frequency-Modulation (PFM) scheme in order to keep the input resistance constant.

The article "Energy Harvesting for Autonomous Systems", Artech House Publishers, pp. 183-187, 2010, ISBN: 9781596937185 by P. D. Mitcheson et. al. discloses a boost converter control loop for controlling the input resistance in a Pulse-Width-Modulation (PWM) scheme.

The PFM and PWM schemes proposed in the prior art are valuable when large input powers are available, but become unfavorable when input powers are remarkably low.

SUMMARY

The present disclosure provides an improved circuit and control method enabling an inductive switch mode DC-DC converter to be used as an energy harvesting circuit.

According to one aspect, there is provided an energy harvesting circuit that includes an input configured to receive an input voltage from an energy source to be harvested, and a switch mode inductive DC-DC converter circuit configured to generate an output voltage from the input voltage, which comprises a timing switch configured to control the switching phase of the converter circuit and an inductor. In this aspect, the energy harvesting circuit also includes a current sensor circuit configured to sense the inductor current, a first timing control circuit configured to control the duration of the on-time of the timing switch in dependence on the sensed inductor current, and a second timing control circuit configured to control the duration of the period of the switch mode inductive DC-DC converter circuit in dependence on the on-time set by the first timing control circuit and the input and output voltages.

This circuit enables independent control of the on-time of the switch mode inductive DC-DC converter main switch, and the full period of the converter cycle. The on-time is the period during which the inductor current ramps up. The on-time can be selected to ensure the current reaches a predetermined level. In this way, very rapid switching can be avoided which can give rise to very high energy consumption. The full cycle period can then be set to achieve a desired constant value of the input resistance $R_{IN}$ of the DC-DC converter, and thereby maximize power transfer. The described solution can be considered to combine pulse width control as well as switching frequency control.

In this way, the circuit allows input resistance control without increasing the power consumption at low available powers. The circuit implementation can be much simpler than previously presented input resistance control methods, and can be achieved using simple analogue circuits.

In addition to avoiding high switching rates at low available powers, the circuit has advantages also at high powers, because the input resistance control can be combined with peak current control, minimizing power train losses.

The first timing control circuit may set the on-time as the time taken for the inductor current to reach a predetermined level. This is a function that can be implemented based on monitoring the inductor current for example using a small series resistor and detecting when the voltage across the resistor reaches a threshold.

The circuit may further comprise a calculating unit configured to calculate the predetermined level of the inductor current in dependence on the input and output voltages. In this way, an optimum peak current can be set which takes into account the input and output voltages. For example, the peak current can be set so that the power train losses in the switch mode inductive DC-DC converter are minimized.

The second timing control circuit may comprises a capacitor, a first current source configured to charge the capacitor, a switch configured to control the timing during which the first current source current flows to the capacitor, a second current source configured to discharge the capacitor, and a detector configured to detect the capacitor voltage and generate a timing signal in dependence on the capacitor voltage.

This provides an analog circuit implementation of the desired (quadratic) function, which defines the converter cycle period. Note that the second current source can coupled to the capacitor at all times, so that the charging current is based on the difference between the two current source currents, and the discharging current is based on the second current source current.

The detector may comprise a comparator configured to generate a timing pulse when the capacitor voltage reaches a reference value. Thus, the second timing control circuit is used to charge and then discharge a capacitor, and the time taken to discharge (for example back to the starting voltage level) is made to correspond to the desired cycle period of the DC-DC converter.

The first current source may provide a scaled version of the inductor current and the second current source may provide a current proportional to the input voltage. These currents can be derived from the existing voltages and currents prevailing in the switch mode inductive DC-DC converter, and they can thus easily be obtained by simple analog circuits. It has been established that this circuit can replicate the equations setting the desired cycle period for setting the input resistance of a buck, boost or buck-boost converter. The current source currents can be selected to be very small scaled versions so that the circuit function can consume a low amount of power.

In the case of a buck converter or a buck-boost converter, the switch (of the second timing control circuit) is closed during the on-time of the timing switch of the switch mode inductive DC-DC converter. In the case of a boost converter, the switch (of the second timing control circuit) is closed during the inductor conduction period (e.g., when the inductor current ramps up as well as down) of the switch mode inductive DC-DC converter.

According to another aspect, there is provided an energy harvesting method that includes providing an input voltage to a switch mode inductive DC-DC converter which comprises a timing switch configured to control the switching phase of the converter circuit and an inductor. In this aspect, during each cycle of the switch mode inductive DC-DC converter, the method includes: monitoring the inductor current to determine when a predetermined level has been reached and then ending the on-time of the timing switch; deriving a desired total DC-DC converter cycle period in dependence on the on-time and on the input and output voltages; and starting the next on-time of the timing switch after the desired total DC-DC converter cycle period has elapsed.

As explained above, this method enables independent control of the duration of the on-time of the switch mode inductive DC-DC converter switch and the overall cycle period.

Deriving a desired total DC-DC converter cycle period can be based on charging a capacitor with the output of a first current source during a first time period and discharging the capacitor with the output of a second current source during a second time period after the first time period. A timing signal can then be generated in dependence on the capacitor voltage.

BRIEF DESCRIPTION OF THE DRAWINGS

Example embodiments will now be described in detail, with reference to the accompanying drawings.

DETAILED DESCRIPTION

An example embodiment provides an energy harvesting circuit based on a switch mode inductive DC-DC converter circuit. The inductor current is sensed and the duration of the on-time (when the inductor current is increasing) is controlled in dependence on the sensed inductor current. The duration of the overall switching period of the switch mode inductive DC-DC converter circuit is controlled in dependence on the on-time set by the first timing control circuit and also on the input and output voltages. This circuit enables the independent control of the on-time of the switch mode inductive DC-DC converter main switch, as well as and the full period of the converter cycle. Very rapid switching can be avoided which can give rise to very high energy consumption. The full cycle period can be set to achieve a desired constant value of the input resistance $R_{IN}$ of the DC-DC converter, and thereby maximize power transfer.

As mentioned above, conventional PFM and PWM schemes are useful when large input powers are available, but become unfavorable when input powers are remarkably low. This issue will now be explained further. It is assumed that the input resistance of the converter $R_{IN}$ is chosen to match the source resistance Rs. This is the condition for the maximum power transfer from the source to the load. This is the desired operating condition for a low power energy harvesting system. Note that it is not necessarily the most efficient power transfer mode, for which a load resistance much greater than the source resistance is desired. However, in low power energy harvesting applications, the energy source is freely available, and the aim is to transfer as much power to the load as possible.

In this case, the input power becomes equal to the available source power $P_{AV}=V_{IN}^2/R_{IN}$. Thus, it becomes possible in the calculations below to simply substitute $V_{IN}$ with the square root of $P_{AV}*R_{IN}$.

In ultra-low available power conditions, the one efficient way of controlling an inductive DC-DC converter is using the Discontinuous Conduction Mode (DCM).

Figure 3:
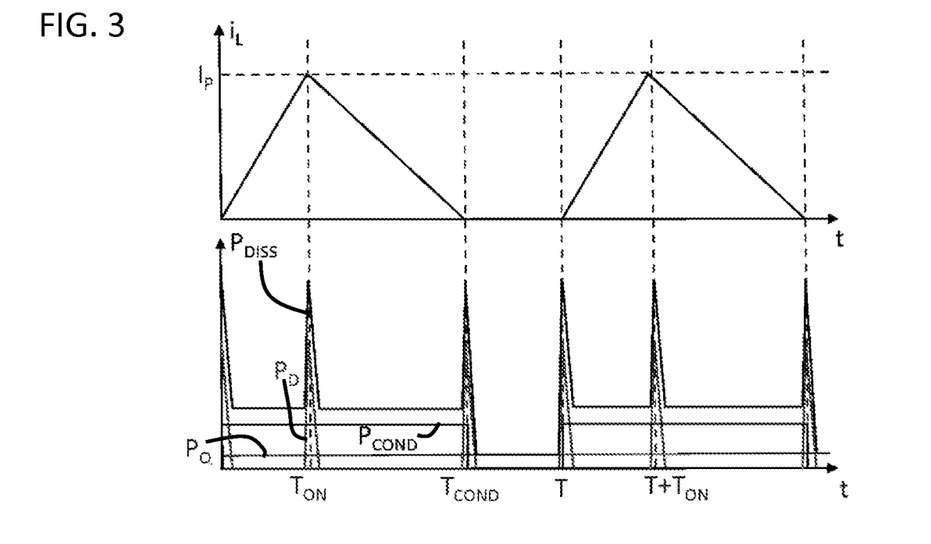
FIG. 3 shows a timing diagram for an inductive switch mode DC-DC converter and is used to explain the power losses.

FIG. 3 shows the main power consumption contributions in an inductive DC-DC converter operating in a Discontinuous Conduction Mode. The top plot shows the inductor current over time. Each overall period (T) of the converter cycle has three sub-periods. Time 0 to $T_{ON}$ is the ramp up time of the inductor current and is the on-time of the converter switch Q1. Time $T_{ON}$ to $T_{COND}$ is the power transfer time. There is an inductor current from time 0 to $T_{COND}$ and this is named in the application the "inductor conduction period". The remainder of the overall period is the non-conduction time.

The bottom plot shows the various power loss functions over time. As shown in FIG. 3, the control circuit power consumption contributions in a DC-DC converter working in DCM can be considered as the sum of three terms: the dynamic power ($P_D$), the conduction power ($P_{COND}$) and the quiescent power ($P_Q$). The dynamic power $P_D$ is proportional to the inverse of the switching period T, the conduction power $P_{COND}$ (due to activation of circuits only during the conduction phase) is proportional to $T_{COND}/T$, and the quiescent power $P_Q$ is always present. Note that the simplifying assumption to have a control circuit power consumption more or less constant during the conduction phase is a good approximation of most circuit topologies. If design-specific non-constant power consumption is taken into account, the following equations will of course change.

Based on the assumptions above, the power consumption contributions of the control circuits can be expressed in the following way:

$$P_{DISS} = P_Q + P_{COND} + P_D$$
$$= P_Q + \frac{k_1 T_{COND}}{T} + \frac{k_2}{T}$$

where $k_1$ and $k_2$ are constants dependent on the specific design.

In a PFM scheme, the on-time $T_{ON}$ is fixed and the period T is used to control the input resistance. For example, the input resistance of an open-loop buck converter based on the input voltage over the average of the input current is given by:

$$R_{IN} = \frac{V_{IN}}{I_{IN}} = \frac{2V_{IN}T}{I_P T_{ON}}$$

Since the peak current can be expressed as:

$$I_P = \frac{T_{ON}(V_{IN} - V_{OUT})}{L}$$

it follows that the period associated with a certain value of the input resistance is:

$$T = \frac{T_{ON}^2 R_{IN}(V_{IN} - V_{OUT})}{2V_{IN}L}$$

In this way, the total power consumption of the control circuits in a buck converter results in:

$$P_{DISS} = P_Q + \left(\frac{k_1 T_{ON} V_{IN}}{V_{OUT}} + k_2\right)\frac{1}{T}$$
$$= P_Q + \left(\frac{k_1 T_{ON} V_{IN}}{V_{OUT}} + k_2\right)\frac{2V_{IN}L}{(V_{IN} - V_{OUT})T_{ON}^2 R_{IN}}$$
$$= P_Q + \left(\frac{k_1 T_{ON} \sqrt{R_{IN} P_{AV}}}{V_{OUT}} + k_2\right)\frac{2\sqrt{R_{IN} P_{AV}} L}{(\sqrt{R_{IN} P_{AV}} - V_{OUT})T_{ON}^2 R_{IN}}$$

For $V_{IN}$ very close to $V_{OUT}$ or $P_{AV}$ very close to $V_{OUT}^2/R_{IN}$, the power dissipation runs out of control. The reason is that when the input voltage decreases, the peak current also decreases and the only way to keep constant the input resistance is to increase the operating frequency, with obvious consequences on the power consumption. This is a problem, because when the available power is low the circuit tends to consume more, with a consequent reduction of the efficiency.

PWM schemes in buck converters suffer the same constraint. In this case the period T is fixed and the on-time $T_{ON}$ is modulated in order to keep constant the input resistance. The power dissipation can then be expressed by:

$$P_{DISS} = P_Q + \frac{k_1 V_{IN}}{V_{OUT}T} T_{ON} + \frac{k_2}{T}$$

$$= P_Q + \frac{k_1 V_{IN}}{V_{OUT}T} \sqrt{\frac{2V_{IN}TL}{R_{IN}(V_{IN} - V_{OUT})}} + \frac{k_2}{T}$$

$$= P_Q + \frac{k_1 \sqrt{R_{IN} P_{AV}}}{V_{OUT}T} \sqrt{\frac{2\sqrt{R_{IN} P_{AV}}\,TL}{R_{IN}(\sqrt{R_{IN} P_{AV}} - V_{OUT})}} + \frac{k_2}{T}$$

Also in this case the power dissipation of the control circuits gets out of control if the difference between the input and output voltages is too small. The qualitative reason is that, when the input voltage decreases, the ratio $T_{COND}/T$ increases, bringing the converter closer and closer to the threshold between the discontinuous conduction mode and the continuous conduction mode.

Note that this constraint does not affect only buck converters, but also boost converter configurations.

In Table 1, the control power dissipation is compared for the three types of inductive converters, for the PFM and PWM control schemes proposed in the prior art.

TABLE 1

| | PFM | PWM |
|---|---|---|
| Buck Converter | $P_Q + \left(\frac{k_1 T_{ON} V_{IN}}{V_{OUT}} + k_2\right) \frac{2V_{IN}L}{(V_{IN} - V_{OUT})T_{ON}^2 R_{IN}}$ | $P_Q + \frac{k_1 V_{IN}}{V_{OUT}T} \sqrt{\frac{2V_{IN}TL}{R_{IN}(V_{IN} - V_{OUT})}} + \frac{k_2}{T}$ |
| Boost Converter | $P_Q + \frac{2k_1 L}{R_{IN} T_{ON}} + \frac{2k_2 L(V_{OUT} - V_{IN})}{R_{IN} T_{ON}^2 V_{OUT}}$ | $P_Q + k_1 \sqrt{\frac{2L V_{OUT}}{T R_{IN}(V_{OUT} - V_{IN})}} + \frac{k_2}{T}$ |
| Buck/Boost Converter | $P_Q + \frac{2L k_1(V_{OUT} + V_{IN})}{T_{ON} V_{OUT} R_{IN}} + \frac{2k_2 L}{T_{ON}^2 R_{IN}}$ | $P_Q + \frac{k_1(V_{OUT} + V_{IN})}{V_{OUT}T} \sqrt{\frac{2TL}{R_{IN}}} + \frac{k_2}{T}$ |

As shown in Table 1, the buck-boost converter has no issues with the increase of power consumption when the input voltage is close to the output voltage. The boost converter consumption does not run out of control at low powers if a PFM scheme is used, but still suffers of the same problem if the PWM scheme is adopted.

In general, it can be concluded that this constraint forces designers to accept suboptimal performances, especially when the efficiency is limited by the control circuit consumption.

According to an example embodiment, the solution aims to provide a system capable to emulate a constant resistance while avoiding the increase of control circuit consumption at low available powers.

The input resistances of open-loop DC-DC inductive converters, without any assumption on the value of the variables involved, are defined by:

Buck: $R_{IN} = \frac{2LTV_{IN}}{T_{ON}^2(V_{IN} - V_{OUT})}$

Boost: $R_{IN} = \frac{2LT(V_{OUT} - V_{IN})}{T_{ON}^2 V_{OUT}}$

Buck/Boost: $R_{IN} = \frac{2LT}{T_{ON}^2}$

It can be seen that all these converters have an equivalent input resistance $R_{IN}$ dependent on both T and $T_{ON}$.

Examples are based on the idea of designing a control mechanism in which both T and $T_{ON}$ can be varied at the same time and independently in order to regulate the input resistance, while avoiding the increase of control circuit power dissipation at low available powers. This approach gives two degrees of freedom. One can be used to fix the peak current $I_P$ to a constant value and the other can be used to set in the input resistance $R_{IN}$.

Figure 4:
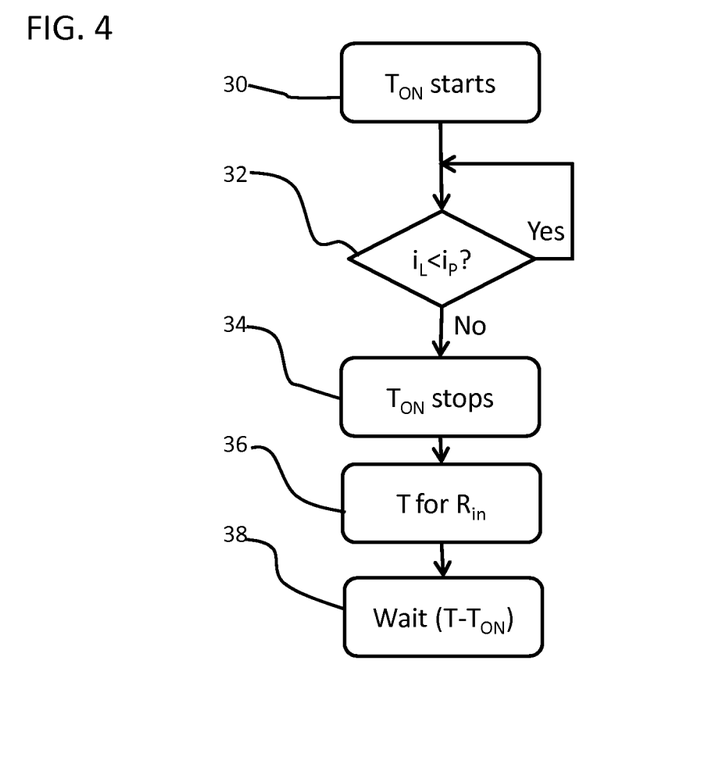
FIG. 4 shows a first example of control method in accordance with an example.

FIG. 4 is a flow chart to show a first example of a control method for controlling an inductive DC-DC converter.

At block 30, the conduction period begins. During the on-time the inductor current ramps up, and the level of the current $i_L$ is monitored to determine if a peak $i_P$ has been reached. This is shown at block 32. When the peak has been reached (i.e. it is no longer true that $i_L < i_P$) the process proceeds to block 34 at which the switching phase is controlled so that inductor charging is stopped.

Based on the on-time $T_{ON}$ that had passed, the desired total cycle period T is derived at block 36 in order to achieve a desired constant value of the input resistance $R_{IN}$. The process then waits to the end of the total cycle period at block 38, with the wait time dependent on the derived cycle period T.

In this way, the operation is particularly suitable for power harvesting, as the input resistance is kept constant.

Taking a buck converter as an example, it is clear that when the available power decreases, the on-time will become larger in order to keep constant the peak current, and then the period T will increase in order to keep constant the input resistance.

This decrease of operating frequency will give a decrease of the control circuit power consumption. This can be seen also by deriving the equation of the control circuit power dissipation for a buck converter using the proposed algorithm:

$$P_{DISS} = P_Q + \frac{k_1 V_{IN}}{V_{OUT}T} T_{ON} + \frac{k_2}{T}$$

$$= P_Q + \frac{1}{T}\left[\frac{k_1 V_{IN}}{V_{OUT}} \frac{LI_P}{V_{IN} - V_{OUT}} + k_2\right]$$

$$= P_Q + \frac{2V_{IN}(V_{IN} - V_{OUT})}{I_P^2 L R_{IN}} \left[\frac{k_1 V_{IN} L I_P}{V_{OUT}(V_{IN} - V_{OUT})} + k_2\right]$$

$$= P_Q + \frac{2\sqrt{R_{IN} P_{AV}}\,(\sqrt{R_{IN} P_{AV}} - V_{OUT})}{I_P^2 L R_{IN}}$$

$$\left[\frac{k_1 \sqrt{R_{IN} P_{AV}}\, LI_P}{V_{OUT}(\sqrt{R_{IN} P_{AV}} - V_{OUT})} + k_2\right]$$

If $V_{IN}$ tends to $V_{OUT}$, instead of the power dissipation tending to the infinite value obtained with the PFM and PWM schemes explained above, the power dissipation tends to:

$$\lim_{V_{IN} \to V_{OUT}} P_{DISS} = P_Q + \frac{2k_1 P_{AV}}{I_P V_{OUT}}$$

Thus, the available power $P_{AV}$ is reduced, the second term will continue to decrease and the power consumption will be dominated by the quiescent power.

This equation is valid also if the capacitive power losses in the power train are considered, because they can be incorporated in the dynamic power term. This formula would change if the conduction losses would start to be dominant. So, in practical cases, in order to maximize the efficiency at low powers, the designer can choose the value of $I_P$ as the maximum for which the power train resistive losses can still be neglected.

The dissipated power for the three converter topologies are now presented based on the general approach shown in FIG. 4.

The first two tables (Table 2 and Table 3) below show the proposed PFM and PWM schemes, and in the third table (Table 4) below, the approach of FIG. 4 is presented, and given the name "Pulse Frequency and Width Modulation (PFWM)".

TABLE 2

| PFM | |
| --- | --- |
| Buck Converter | $P_Q + \left(\frac{k_1 T_{ON} V_{IN}}{V_{OUT}} + k_2\right) \frac{2 V_{IN} L}{(V_{IN} - V_{OUT}) T_{ON}^2 R_{IN}}$ |
| Boost Converter | $P_Q + \frac{2 k_1 L}{R_{IN} T_{ON}} + \frac{2 k_2 L (V_{OUT} - V_{IN})}{R_{IN} T_{ON}^2 V_{OUT}}$ |
| Buck/Boost Converter | $P_Q + \frac{2 L k_1 (V_{OUT} + V_{IN})}{T_{ON} V_{OUT} R_{IN}} + \frac{2 k_2 L}{T_{ON}^2 R_{IN}}$ |

TABLE 3

| PWM | |
| --- | --- |
| Buck Converter | $P_Q + \frac{k_1 V_{IN}}{V_{OUT} T} \sqrt{\frac{2 V_{IN} T L}{R_{IN}(V_{IN} - V_{OUT})}} + \frac{k_2}{T}$ |
| Boost Converter | $P_Q + k_1 \sqrt{\frac{2 L V_{OUT}}{T R_{IN}(V_{OUT} - V_{IN})}} + \frac{k_2}{T}$ |
| Buck/Boost Converter | $P_Q + \frac{k_1 (V_{OUT} + V_{IN})}{V_{OUT} T} \sqrt{\frac{2 T L}{R_{IN}}} + \frac{k_2}{T}$ |

TABLE 4

| PFWM | |
| --- | --- |
| Buck Converter | $P_Q + \frac{2 V_{IN}(V_{IN} - V_{OUT})}{I_P^2 L R_{IN}} \left[\frac{k_1 V_{IN} L I_P}{V_{OUT}(V_{IN} - V_{OUT})} + k_2\right]$ |
| Boost Converter | $P_Q + \frac{2 k_1 V_{IN}}{R_{IN} I_P} + \frac{2 k_2 V_{IN}^2 (V_{OUT} - V_{IN})}{R_{IN} I_P^2 L V_{OUT}}$ |

TABLE 4-continued

| PFWM | |
| --- | --- |
| Buck/Boost Converter | $P_Q + \frac{2 k_1 V_{IN}(V_{OUT} + V_{IN})}{R_{IN} I_P V_{OUT}} + \frac{2 k_2 V_{IN}^2}{R_{IN} L I_P^2}$ |

It can be observed that the method for controlling the input resistance helps to prevent the problem of increase of power consumption at low powers: the control circuit power consumption monotonically decreases as the available power decreases.

A second consequence of fixing the peak current is that sensing operations become easier. For example, if the inductor current is to be monitored with a current sensor, this circuit can be optimized for a certain peak current value, achieving in this way a better performance over a wide range of input and output voltages.

The implementation of the control method needs to be achievable with low power circuits. Some detailed implementations will now be explained which enable the required control algorithm to be implemented by simple circuits.

Figure 5:
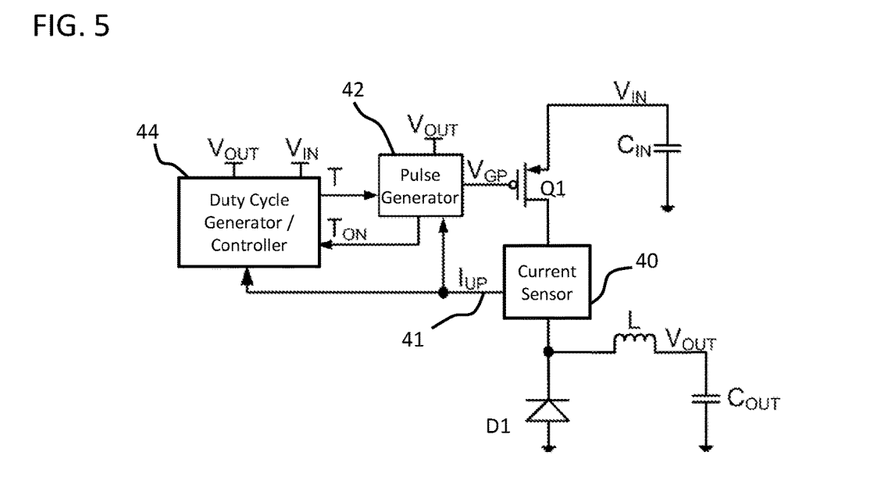
FIG. 5 shows in schematic form an example of energy harvesting circuit in accordance with an example.

FIG. 5 shows an example of implementation of the PFWM scheme for a buck converter, in schematic form.

As in FIG. 1(*a*), a transistor Q1 is connected between the input $V_{IN}$ and the inductor L. The other side of the inductor connects to the output $V_{OUT}$ across which a smoothing capacitor $C_{OUT}$ is provided. The diode D1 is in parallel with the series combination of the inductor L and output capacitor. Note that the diodes in the circuits can be implemented as active diodes, comprising a transistor and a comparator to drive the transistor at the appropriate times. Active diode implementations can be used to limit losses, for example.

A current sensor 40 detects the rising inductor current $I_{UP}$ during the on-time $T_{ON}$ and provides this as output 41. The sensed current $I_{UP}$ is used to control a pulse generator 42 and a duty cycle generator 44. The pulse generator turns off the transistor Q1 when the target inductor current is reached. The duty cycle controller 44 receives the resulting on-time $T_{ON}$ from the pulse generator 42 as well as the current signal, and using the input and output voltages, it derives the required overall time period T. The pulse generator then controls the transistor Q1 to set the overall period T.

Figure 6:
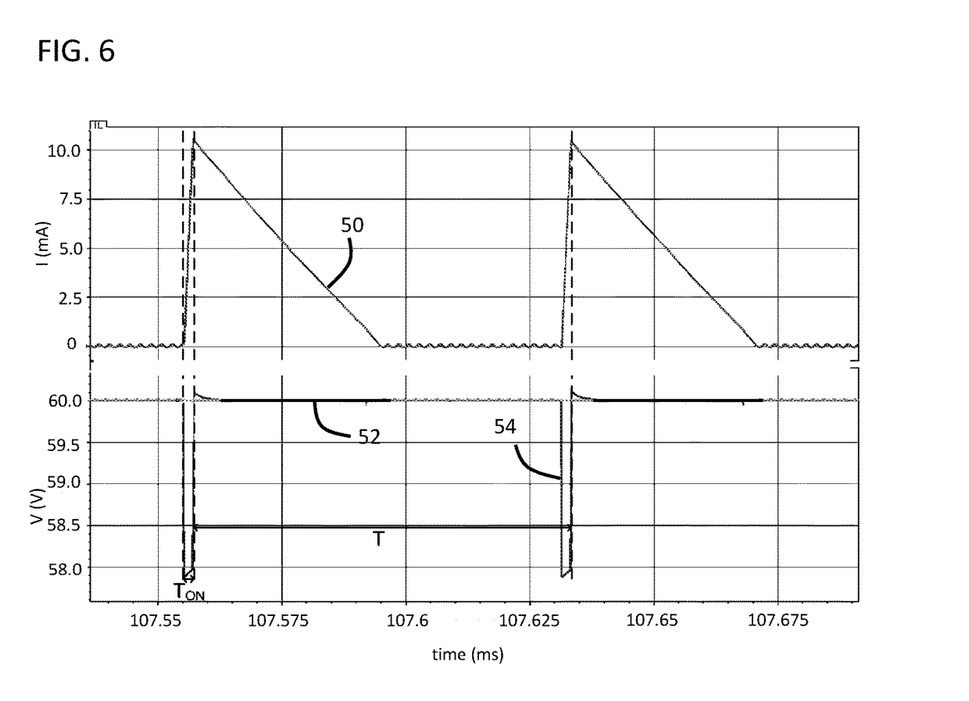
FIG. 6 shows a timing diagram for the circuit of FIG. 5.

FIG. 6 shows some typical waveforms of the DC-DC inductive buck converter if the input voltage is 60V, the output voltage is 3V and the inductor value is 10 mH. The inductor current is shown as plot 50, the input voltage is shown as 52 and the gate voltage of the p-type transistor Q1 is shown as 54. The transistor is turned on (with a low gate signal) during the rising slope of the inductor current 50.

The pulse generator 42 waits for the signal T from the duty-cycle generator 44 and starts the conversion by turning on the p-type transistor Q1. The inductor current starts to rise and is monitored by the current sensor 40. A scaled copy of the inductor current $I_{UP}$ is sent both to the Pulse Generator 42 and to the Duty-Cycle generator 44. When $I_{UP}$ reaches the target value, the pulse generator turns off the p-type transistor Q1.

The duty-cycle generator, using also the values of the input voltage $V_{IN}$ and output voltage $V_{OUT}$, determines the right value of the period T to keep the input resistance constant.

The current sensor, for example, may comprise a resistive component in series with the inductor, which thus generates a voltage across it which is dependent on the inductor current. The pulse generator may be a simple latch type circuit.

The duty cycle generator may require more detailed consideration to enable an implementation which can be achieved with the required extremely low power consumption.

The desired relationship between T, $V_{IN}$, $V_{OUT}$ and $T_{ON}$ is the following:

$$T = \frac{T_{ON}^2 R_{IN}(V_{IN} - V_{OUT})}{2LV_{IN}}$$

Figure 7:
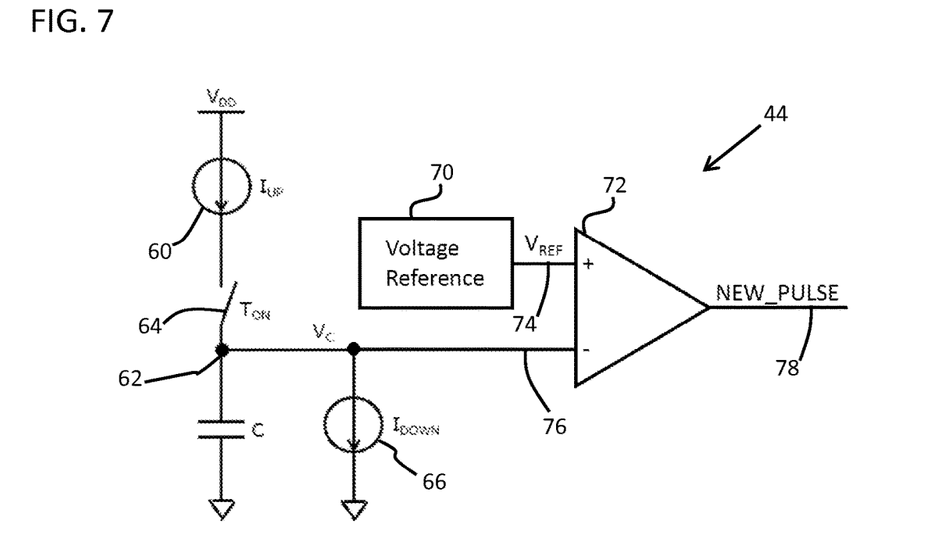
FIG. 7 shows a first example implementation of a duty cycle control circuit used in the circuit of FIG. 5.

FIG. 7 shows an implementation of the duty cycle generator 44 for buck and buck/boost converters.

The circuit comprises a first current source 60 which delivers a sampled and scaled version $I_{UP}$ of the inductor current $I_L$. It provides this current only during the on-time of the transistor Q1 to a node 62. For this purpose a switch 64 is connected in series with the current source 60. This can be controlled by the same single as generated by the pulse generator 42 for controlling the main switching transistor Q1.

A second current source 66 draws a current $I_{DOWN}$ from the node 62. A capacitor C provides smoothing of the voltage at the node 62, which is labeled $V_C$ in FIG. 7. In this circuit example, the second current source is connected to the node 62 all the time, so that the charging of the capacitor it based on the difference between the current source outputs. In other examples, a different implementation could use only one current source for charging and only one for discharging.

In the circuit of FIG. 7, the currents $I_{UP}$ and $I_{DOWN}$ are as follows:

$$I_{UP} = \frac{i_L}{N} = \frac{(V_{IN} - V_{OUT})}{NL} t$$

$$I_{DOWN} = k_{MPPT} V_{IN}$$

The value N is a scaling factor for the copy of the inductor coil current and $k_{MPPT}$ is a variable used by a Maximum Power Point Tracking, or by some user-defined static bits, to change the input resistance in order to match the source resistance.

Figure 8:
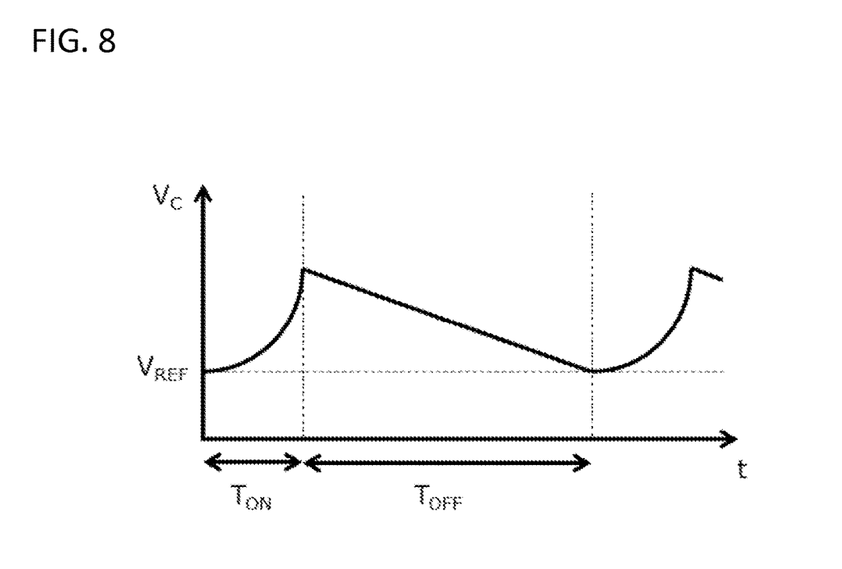
FIG. 8 is a timing diagram to explain the operation of the circuit of FIG. 7.

As shown in FIG. 8, assuming the input and output voltages are constant during a conversion cycle, these currents mean that during the on-time interval the capacitance voltage $V_C$ increases quadratically. This results from the current of the first current source increasing linearly in proportion with the inductor current. Afterwards the voltage $V_C$ decreases linearly as there is only a constant current source draining current from the capacitor C.

The current $I_{DOWN}$ can be simply derived using a resistor connected to the input voltage $V_{IN}$. The circuit can be tailored to a particular source resistance by changing just one scaling factor.

Thus, the measured value of $I_{DOWN}$ is proportional to $V_{IN}$. Inside the integrated circuit, the measured current can be copied with a scaling factor which is dynamically changed in order to maximize the output power. A Maximum Power Point Tracking (MPPT) algorithm can be used for this purpose. The algorithm scales $I_{DOWN}$ in such a way as to obtain the desired value of $R_{IN}$. In this way, the scaling factor is implemented automatically and on-chip. It can even adapt to drift of the value of $R_{IN}$ in the device, due to aging or other degrading processes.

This circuit gives rise to a capacitor voltage period which is equal to:

$$T = \frac{\int_0^{T_{ON}} I_{UP}(t) dt}{I_{DOWN}} = \frac{(V_{IN} - V_{OUT})}{2NLk_{MPPT}V_{IN}} T_{ON}^2$$

The value of the capacitance is a compromise. A large capacitance is desirable to enable a large current $I_{DOWN}$ (which means precise current generation and copying). It also means the voltage on the capacitor is prevented from reaching the power supply level. Saturation would then occur, so that charge would stop flowing for large input power ranges, such as from 1 μW to 100 mW. A small value of capacitance is desired to reduce power consumption since if $I_{DOWN}$ is larger then also the current flowing in the resistor from $V_{IN}$ will need to be larger to avoid mismatch errors between the external resistor current and $I_{DOWN}$. A smaller capacitance also enables a reduced area occupation on-chip.

The gives an input resistance equal to:

$$R_{IN} = \frac{1}{Nk_{MPPT}}$$

Referring back to FIG. 7, the voltage $V_C$ is compared with a reference voltage $V_{REF}$ provided by a reference voltage block 70 using a comparator 72. The output of the voltage reference block 70 provides the non-inverting input 74 to the comparator 72 and the voltage $V_C$ is provided as the inverting input 76. The output 78 of the comparator 72 is a signal "NEW_PULSE" which has a period equal to T and represents the information given by the duty cycle generator 44 to the pulse generator 42, in order to start a new conversion step.

In this way, the mathematical function defining the desired overall switching period T can be implemented by a simple analogue circuit which charges/discharges a capacitor using two current sources, one of which delivers a current which is a scaled value of the inductor current and the other is a constant current which is proportional to the input voltage.

The same implementation can be used in a buck/boost converter. In this case, the optimal period is equal to:

$$T = \frac{T_{ON}^2 R_{IN}}{2L}$$

This period is the same as obtained by adopting the scheme shown in FIG. 7, because in a buck/boost converter:

$$\int_0^{T_{ON}} I_{UP}(t) dt = \frac{T_{ON}^2 V_{IN}}{2NL}$$

This yields:

$$T = \frac{\int_0^{T_{ON}} I_{UP}(t)\,dt}{I_{DOWN}} = \frac{T_{ON}^2}{2NLk_{MPPT}}$$

Again this gives rise to the desired optimal period with:

$$R_{IN} = \frac{1}{Nk_{MPPT}}$$

A similar implementation can be used for a DC-DC boost converter.

Figure 9:
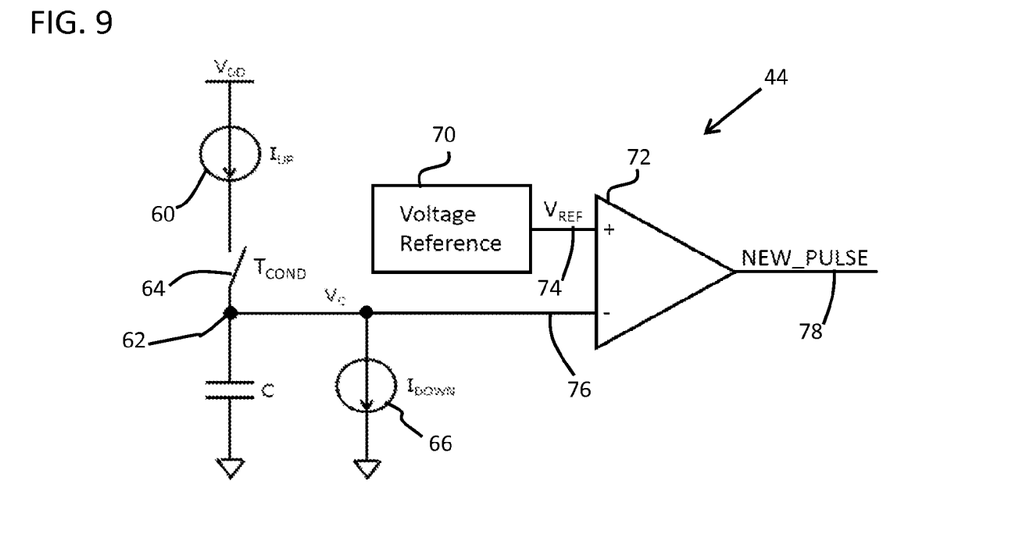
FIG. 9 shows a second example implementation of a duty cycle control circuit used in the circuit of FIG. 5.

Another example is shown in FIG. 9. The circuit is almost identical to FIG. 7, and the same reference numbers have been used for the same components. The only illustrated change is the time during which the switch 64 is turned on, as shown in FIG. 9. The switch is now on for the conduction period $T_{COND}$, i.e. the full period while current is flowing through the inductor as shown in FIG. 3. In this case, the optimal period is equal to:

$$T = \frac{T_{ON}^2 R_{IN} V_{OUT}}{2L(V_{OUT} - V_{IN})}$$

By integrating the inductor current copy during all of the conduction time $T_{COND}$, the following value results:

$$\int_0^{T_{COND}} I_{UP}(t)\,dt = \frac{T_{ON}^2 V_{OUT} V_{IN}}{2NL(V_{OUT} - V_{IN})}$$

And then:

$$T = \frac{\int_0^{T_{COND}} I_{UP}(t)\,dt}{I_{DOWN}} = \frac{T_{ON}^2 V_{OUT}}{2NLk_{MPPT}(V_{OUT} - V_{IN})}$$

Again, this gives rise to the desired optimal period with:

$$R_{IN} = \frac{1}{Nk_{MPPT}}$$

The method of FIG. 4 can be supplemented to provide dynamic control of the peak current, in order to keep it equal to an optimal value, while also controlling the input resistance.

For example, in a buck converter the power train capacitive power loss $P_C$ and resistive power loss $P_R$ can be calculated as:

$$P_C = \frac{C_{PAR} V_{IN}^2}{2T} = \frac{P_{IN} C_{PAR} V_{OUT}(V_{IN} - V_{OUT})}{I_P^2 L}$$

$$P_R = \frac{R_{PT} I_P^2 T_{COND}}{3T} = \frac{2R_{PT} I_P P_{IN}}{3V_{IN}}$$

$R_{PT}$ and $C_{PAR}$ are respectively the total parasitic series resistance in the power train and the parasitic capacitance connected between the switching net and ground. By summing $P_C$ and $P_R$ and finding the zero of the derivative with respect to $I_P$, the optimum $I_{POPT}$ can be found which minimizes power train losses. In particular, for a buck converter, this value results:

$$I_{POPT} = \sqrt[3]{\frac{3 C_{PAR}}{R_{PT} L} V_{IN} V_{OUT} (V_{IN} - V_{OUT})}$$

It can be noticed that $I_{POPT}$ varies with the input and output voltage. Thus, an extension of the basic embodiment is to add a control loop that first calculates the optimal peak current from $V_{IN}$ and $V_{OUT}$, and then derives the best values of $T_{ON}$ and $T$ in order to keep the input resistance constant. Approximations or digital look up tables may be used to make the peak current vary in a way which more or less follows this equation. Look up tables, relating values of $V_{IN}$ and $V_{OUT}$ to optimal values of $I_P$, can be implemented with low power. Alternatively, the values of $V_{IN}$ and $V_{OUT}$ can be sampled (during $T_{ON}$). The difference can be found and compared with a threshold to derive $T_{ON}$. After $T_{ON}$ the circuit can be disabled for low power.

Figure 10:
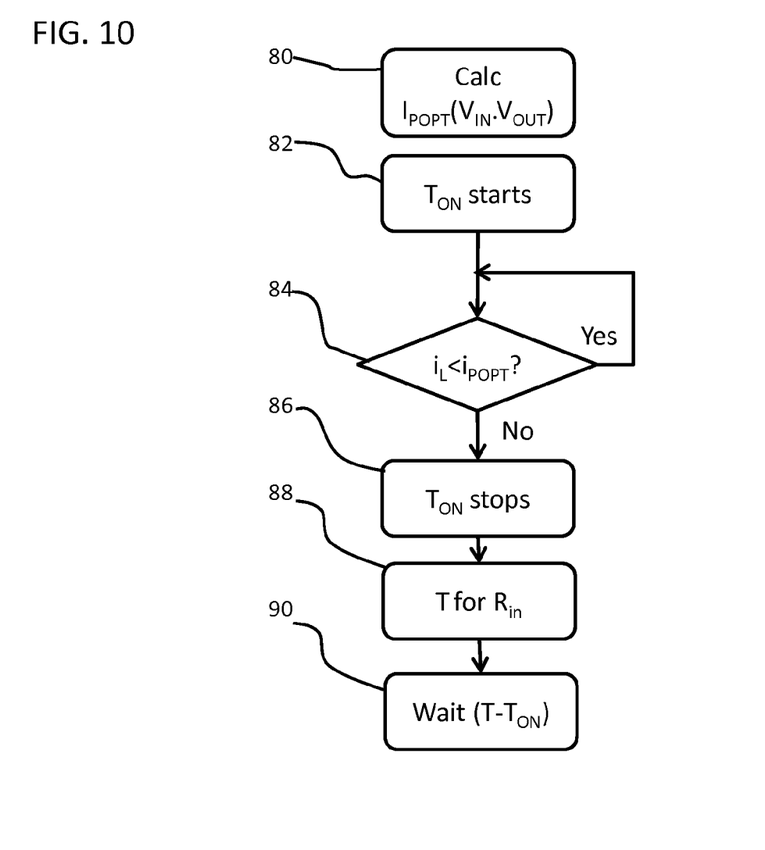
FIG. 10 shows a second example of control method in accordance with an example.

A flowchart of this concept is shown in FIG. 10. At block 80, the optimum value of the peak inductor current is calculated, taking account of the input and output voltages.

At block 82, the conduction period begins. The inductor current ramps up (and down), and the level of the current $i_L$ is monitored to determine if the optimum peak $i_{POPT}$ has been reached. This is shown at block 84. When the optimum peak has been reached (i.e. it is no longer true that $i_L < i_{POPT}$) the process proceeds to block 86 at which the on-period is stopped.

Based on the on-time $T_{ON}$ that passed, the desired total cycle period T is derived at block 88 in order to achieve a desired constant value of the input resistance $R_{IN}$. The process then waits to the end of the total cycle period at block 90.

This modification to the method increases the efficiency even in conditions of large available power, allowing to power train losses to be minimized while regulating the input resistance of the converter.

A similar approach can of course be applied to the other topologies.

The disclosure is of interest for energy harvesting from thermoelectric generators and, under certain conditions, RF and vibrational harvesters. The disclosure is of particular interest for sources with constant internal resistance.

Only one example of switch mode converter circuit has been given in combination with the control circuit of the disclosure (in FIG. 5). The approach can however be applied to all inductive DC-DC converter architectures. There is a need for modelling of the characteristics of the circuit in question, followed by control of the on-period and the overall cycle period in order to achieve a desired input resistance as well as minimum current achieved during the on-time of the main cycling switch of the DC-DC converter.

Various other modifications will be apparent to those skilled in the art.

What is claimed is:
1. An energy harvesting circuit, comprising:
   an input configured to receive an input voltage from an energy source to be harvested;
   a switch mode inductive DC-DC converter circuit configured to generate an output voltage from the input voltage, wherein the switch mode inductive DC-DC converter circuit includes a timing switch configured to control a switching phase of the switch mode inductive DC-DC converter and an inductor;

a current sensor circuit configured to sense an inductor current;

a first timing control circuit configured to control a duration of on-time of the timing switch in dependence on a sensed inductor current; and a second timing control circuit configured to control a duration of a period of the switch mode inductive DC-DC converter circuit in dependence on the on-time controlled by the first timing control circuit and the input and output voltages.

2. The energy harvesting circuit of claim 1, wherein the first timing control circuit sets the on-time as the time taken for the inductor current to reach a predetermined level.

3. The energy harvesting circuit of claim 2, further comprising a calculating unit configured to calculate the predetermined level of the inductor current in dependence on the input and output voltages.

4. The energy harvesting circuit of claim 1, wherein the second timing control circuit comprises a capacitor, a first current source configured to charge the capacitor, a switch configured to control a timing during which a first current source current flows to the capacitor, a second current source configured to discharge the capacitor, and a detector configured to detect a voltage of the capacitor and generate a timing signal in dependence on the capacitor voltage.

5. The energy harvesting circuit of claim 4, wherein the detector comprises a comparator configured to generate a timing pulse when the capacitor voltage reaches a reference value.

6. The energy harvesting circuit of claim 4, wherein the first current source provides a scaled version of the inductor current and the second current source provides a current proportional to the input voltage.

7. The energy harvesting circuit of claim 6, wherein the switch mode inductive DC-DC converter comprises a buck converter or a buck-boost converter, and wherein the switch is closed during the on-time of the timing switch of the switch mode inductive DC-DC converter.

8. The energy harvesting circuit of claim 6, wherein the switch mode inductive DC-DC converter comprises a boost converter, and wherein the switch is closed during an inductor conduction period of the switch mode inductive DC-DC converter.

9. An energy harvesting method, comprising:
providing an input voltage to a switch mode inductive DC-DC converter configured to generate an output voltage from the input voltage, wherein the switch mode inductive DC-DC converter comprises a timing switch configured to control a switching phase of the switch mode inductive DC-DC converter and an inductor, during each cycle of the switch mode inductive DC-DC converter:
monitoring inductor current to determine when a predetermined level has been reached and responsively ending an on-time of the timing switch;
deriving a desired total DC-DC converter cycle period in dependence on the on-time and on the input and output voltages; and
starting a next on-time of the timing switch after the desired total DC-DC converter cycle period has elapsed.

10. The energy harvesting method of claim 9, further comprising calculating the predetermined level of the inductor current in dependence on the input and output voltages.

11. The energy harvesting method of claim 9, wherein deriving the desired total DC-DC converter cycle period comprises:
charging a capacitor with an output of a first current source during a first time period and discharging the capacitor with an output of a second current source during a second time period after the first time period, wherein the second time period is longer than the first time period; and
generating a timing signal in dependence on capacitor voltage.

12. The energy harvesting method of claim 11, further comprising generating a timing pulse when the capacitor voltage reaches a reference value.

13. The energy harvesting method of claim 11, wherein the first current source provides a scaled version of the inductor current and the second current source provides a current proportional to the input voltage.

14. The energy harvesting circuit of claim 13, wherein the switch mode inductive DC-DC converter comprises a buck converter or a buck-boost converter, and wherein the method comprises setting the first time period to correspond to the on-time of the timing switch of the switch mode inductive DC-DC converter.

15. The energy harvesting method of claim 13, wherein the switch mode inductive DC-DC converter comprises a boost converter, and wherein the method comprises setting the first time period to correspond to an inductor conduction period of the switch mode inductive DC-DC converter.

* * * * *